(12) United States Patent
Yoshida et al.

(10) Patent No.: US 9,561,757 B2
(45) Date of Patent: Feb. 7, 2017

(54) WIRING HARNESS

(71) Applicant: Yazaki Corporation, Tokyo (JP)

(72) Inventors: Hiroyuki Yoshida, Kosai (JP); Hideomi Adachi, Kosai (JP)

(73) Assignee: YAZAKI CORPORATION, Tokyo (JP)

( * ) Notice: Subject to any disclaimer, the term of this patent is extended or adjusted under 35 U.S.C. 154(b) by 35 days.

(21) Appl. No.: 14/515,612

(22) Filed: Oct. 16, 2014

(65) Prior Publication Data

US 2015/0034354 A1 Feb. 5, 2015

Related U.S. Application Data

(63) Continuation of application No. PCT/JP2013/061702, filed on Apr. 16, 2013.

(30) Foreign Application Priority Data

Apr. 17, 2012 (JP) ................... 2012-093519

(51) Int. Cl.
- *H02G 15/02* (2006.01)
- *B60R 16/02* (2006.01)
- *H02G 3/04* (2006.01)
- *H02G 3/32* (2006.01)

(52) U.S. Cl.
CPC ......... *B60R 16/0215* (2013.01); *H02G 3/0406* (2013.01); *H02G 3/0481* (2013.01); *H02G 3/32* (2013.01); *H02G 2200/20* (2013.01)

(58) Field of Classification Search
CPC ... H02G 15/08; H01B 7/0045; B60R 16/0207; H01R 4/00

USPC .. 174/110 R, 113 R, 71 R, 72 R, 72 A, 74 R
See application file for complete search history.

(56) References Cited

U.S. PATENT DOCUMENTS

| | | | | | |
|---|---|---|---|---|---|
| 4,415,765 | A | * | 11/1983 | Iwasa | H01B 7/365 174/112 |
| 4,424,627 | A | * | 1/1984 | Tarbox | H01B 7/368 174/112 |
| 5,911,450 | A | * | 6/1999 | Shibata | B60R 16/0207 174/112 |

(Continued)

FOREIGN PATENT DOCUMENTS

| | | |
|---|---|---|
| EP | 0543702 A1 | 5/1993 |
| EP | 2338741 A2 | 6/2011 |

(Continued)

OTHER PUBLICATIONS

Search Report dated Jul. 23, 2013, issued by the International Searching Authority in counterpart International Application No. PCT/JP2013/061702.

(Continued)

*Primary Examiner* — William H Mayo, III
(74) *Attorney, Agent, or Firm* — Sughrue Mion, PLLC

(57) ABSTRACT

A wiring harness includes a conduit member which accommodates therein one or a plurality of conductor lines, and an identifying portion colored in a predetermined color and given a predetermined thickness and a non-identifying portion defined as a portion where the identifying portion is not provided circumferentially, the identifying portion and the non-identifying portion being provided on an outer surface of the conduit member. A retrofit member is attached to the non-identifying portion.

3 Claims, 5 Drawing Sheets

(56) References Cited

U.S. PATENT DOCUMENTS

| | | | | |
|---|---|---|---|---|
| 5,922,996 | A * | 7/1999 | Ryeczek | G01K 11/12 116/207 |
| 6,417,451 | B1 * | 7/2002 | Uchiyama | B60R 16/0215 174/72 A |
| 6,437,248 | B1 * | 8/2002 | Giebel | G02B 6/4482 174/110 R |
| 7,145,081 | B2 * | 12/2006 | Suzuki | H01B 7/36 174/112 |
| 7,364,795 | B2 * | 4/2008 | Daly | B05D 7/06 427/195 |
| 7,423,223 | B2 * | 9/2008 | Taira | B60S 1/48 16/2.1 |
| 8,525,029 | B2 * | 9/2013 | Kato | B60R 16/0215 174/113 R |
| 9,163,756 | B2 * | 10/2015 | Sugiyama | H02G 3/0468 |
| 2004/0107533 | A1 * | 6/2004 | Nishihara | B60R 16/0222 16/2.1 |
| 2005/0011687 | A1 | 1/2005 | Yamaguchi et al. | |
| 2006/0021785 | A1 * | 2/2006 | Kamata | H01B 7/361 174/112 |
| 2006/0070766 | A1 * | 4/2006 | Katsumata | H01B 13/34 174/112 |
| 2009/0107694 | A1 | 4/2009 | Watanabe | |
| 2011/0155458 | A1 | 6/2011 | Kato et al. | |
| 2013/0140054 | A1 | 6/2013 | Kato et al. | |

FOREIGN PATENT DOCUMENTS

| | | | | |
|---|---|---|---|---|
| GB | 905981 A | | 9/1962 | |
| JP | 2004-224156 | * | 8/2004 | 174/72 A |
| JP | 2004224156 A | | 8/2004 | |
| JP | 2005-142113 A | | 6/2005 | |
| JP | 2010-215010 A | | 9/2010 | |
| JP | 2011-36012 A | | 2/2011 | |
| JP | EP 2338741 A2 | * | 6/2011 | 174/72 A |
| JP | 2011-150991 A | | 8/2011 | |
| JP | 201235803 A | | 2/2012 | |
| JP | 2012-45962 A | | 3/2012 | |
| WO | 2007/029801 A1 | | 3/2007 | |

OTHER PUBLICATIONS

Communication issued on Nov. 17, 2015 by the Japanese Patent Office in related Application No. 2012-093519.

* cited by examiner

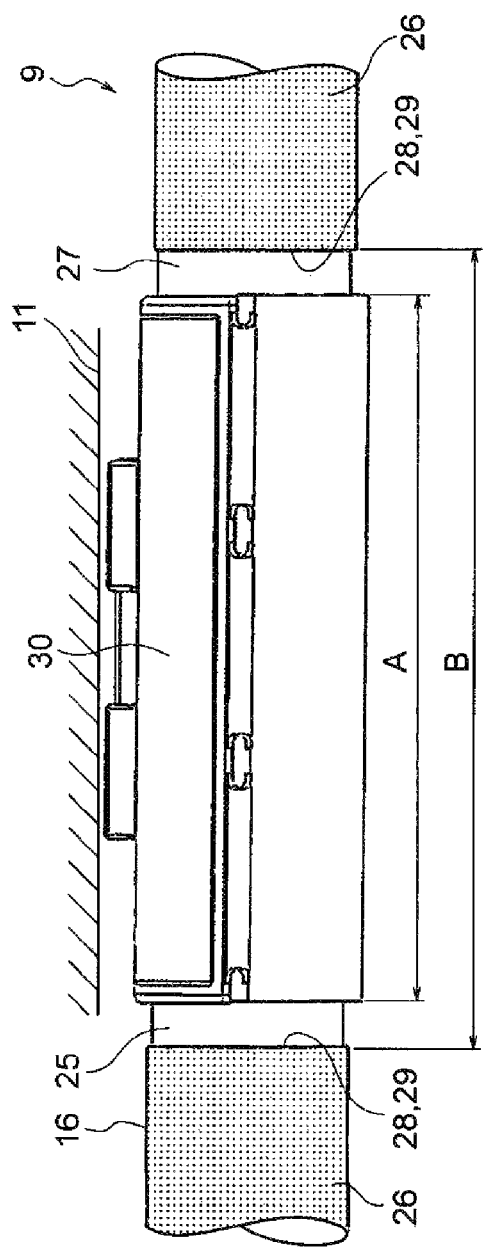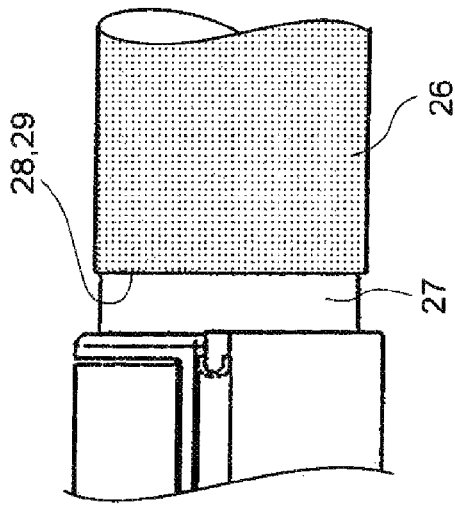

WIRING HARNESS

CROSS REFERENCE TO RELATED APPLICATIONS

This application is a continuation of PCT application No. PCT/JP2013/061702, which was filed on Apr. 16, 2013 based on Japanese Patent Application (No. 2012-093519) filed on Apr. 17, 2012, the contents of which are incorporated herein by reference.

BACKGROUND OF THE INVENTION

1. Field of the Invention

The present invention relates to a wiring harness including a conduit member which accommodates a conductor line.

2. Description of the Related Art

A wiring harness described in JP-A-2004-224156 below includes three high tension electric wires and three metallic conduit members (metallic pipes) which accommodate individually the three high tension electric wires for protection. The high tension electric wires are provided to connect a motor mounted in a front portion of a vehicle and an inverter mounted in an intermediate or rear portion of the vehicle.

The wiring harness is laid to extend along an underside of a body floor which constitutes an outer side of a body frame. Because of this, as the metallic conduit members, a material is adopted which can protect the high tension electric wires from small stones driven or water splashed thereagainst by the vehicle. The metallic conduit members have such rigidity as to protect the high tension electric wires from such small stones or water and to prevent the deflection of the high tension electric wires.

SUMMARY OF THE INVENTION

In the wiring harness including the high tension electric wires, although the metallic conduit members need to be colored orange so that the metallic conduit members are identified as carrying the high tension electric wires, an outside diameter of the individual metallic conduit members is increased to such an extent that they are colored compared with an outside diameter of the metallic conduit members to which no coloring is applied. Additionally, clamps are then attached to the metallic conduit members of which the outside diameter is increased so. Thus, when the wiring harness is laid out on the underside of the body floor with the clamps, the wiring harness so laid out interrupts an attempt to secure a wide road clearance between the road surface and itself, resulting in a problem that the wiring harness is easily affected by small stones driven up thereagainst by the vehicle.

The invention has been made in view of these situations, and an object thereof is to provide a wiring harness which can realize a reduction in its height or projection towards the road surface.

According to the first aspect of the present invention, there is provided a wiring harness, comprising
a conduit member which accommodates therein one or a plurality of conductor lines, and
an identifying portion colored in a predetermined color and given a predetermined thickness and a non-identifying portion defined as a portion where the identifying portion is not provided circumferentially, the identifying portion and the non-identifying portion being provided on an outer surface of the conduit member, wherein a retrofit member is attached to the non-identifying portion.

According to the second aspect of the present invention, a level difference produced between the identifying portion and the non-identifying portion may function as a position restricting portion for the retrofit member.

According to the third aspect of the present invention, the identifying portion may be made up of any of a resin layer, a tube and a painting, and wherein the retrofit member may be made up of any of a clamp, a protector and a grommet.

Thus, according to the invention characterized in the way described above, the wiring harness is configured so as to include the conduit member, and the identifying portion and the non-identifying portion are provided on the outer surface of the conduit member. The conduit member is such that the whole of the outer surface does not constitute the identifying portion. The non-identifying portion is provided as a portion where the identifying portion is not provided, and the outside diameter of the sheathing member becomes smaller at the portion where the non-identifying portion is provided than at the portion where the identifying portion is provided. Then, when the retrofit member is attached to the non-identifying portion where the outside diameter of the sheathing member becomes smaller, the wiring harness is made smaller in size, and the wiring harness can be laid out so as to ensure a wide road clearance relative to the ground, for example. In addition, according to the invention, since the level difference is produced between the identifying portion and the non-identifying portion, it is possible to restrict the position of the retrofit member by the level difference.

According to the first aspect of the invention, since the non-identifying portion is provided on the outer surface of the conduit member which makes up the wiring harness, the retrofit member being attached to the non-identifying portion, the wiring harness is made small in size, and the wiring harness can be laid out so as to ensure a wide road clearance relative to the ground, for example. Consequently, according to the invention, there is provided an advantage that it is possible to realize a reduction in projection of the wiring harness when it is laid out.

According to the second aspect of the invention, in addition to the advantage provided by the first aspect of the invention, there is provided the following advantage. Namely, an advantage is provided that the position of the retrofit member can be restricted by the level difference produced between the identifying portion and the non-identifying portion. By doing so, not only a positional displacement of the retrofit member is prevented, but also the position of the retrofit member is facilitated. Further, when the retrofit member is able to move, the moving range of the retrofit member can be restricted. Thus, there is also provided an advantage that an improvement in workability can be realized.

According to the third aspect of the invention, there is provided an advantage that it becomes possible to provide the preferred identifying portion and retrofit member.

BRIEF DESCRIPTION OF THE DRAWINGS

FIGS. 1A and 1B show a wiring harness of the invention, of which FIG. 1A shows a layout of the wiring harness and FIG. 1B shows a way in which clamps are attached to a conduit member.

FIG. 5A is a side view of the wiring harness, and FIG. 5B is a partial enlarged view of FIG. 5A.

DETAILED DESCRIPTION OF THE EXEMPLARY EMBODIMENTS

A wiring harness includes one or a plurality of conductor lines and a conduit member which accommodates therein the conductor line or lines. Identifying portions and non-identifying portions are provided on the conduit member, and retrofit members are attached to the non-identifying portions. The non-identifying portions are portions where no identifying portion is provided thereon in a circumferential direction. Because of this, an outside diameter of the non-identifying portion becomes smaller than an outside diameter of the identifier portion of the conduit member.

Embodiment

Figure 1A:
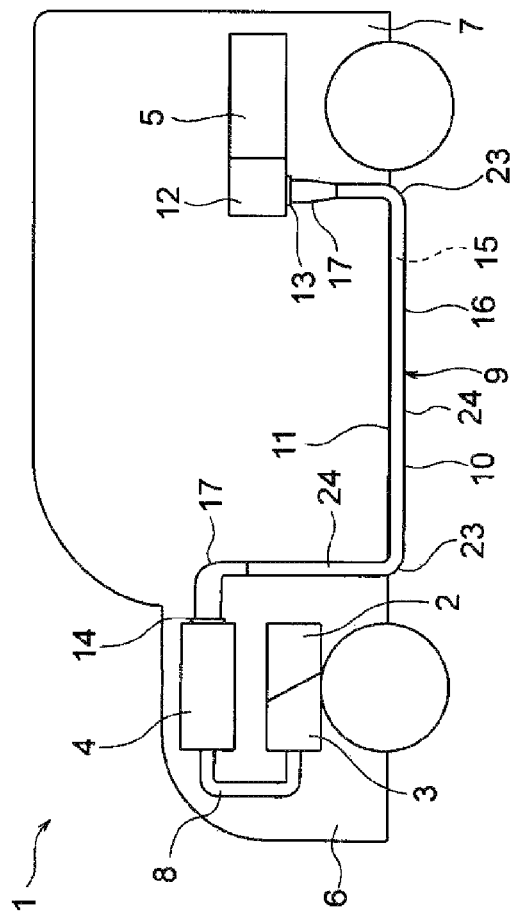
Figure 1B:
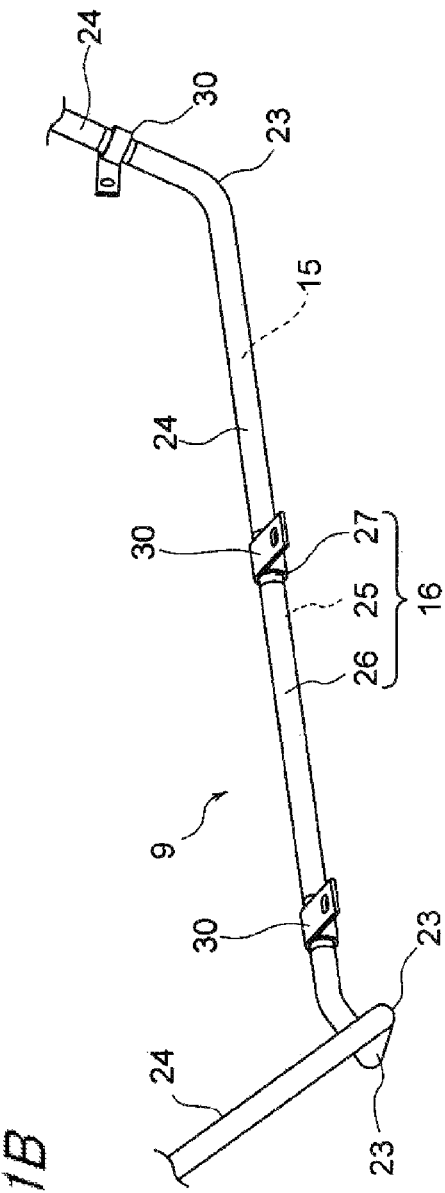
Figure 2A:
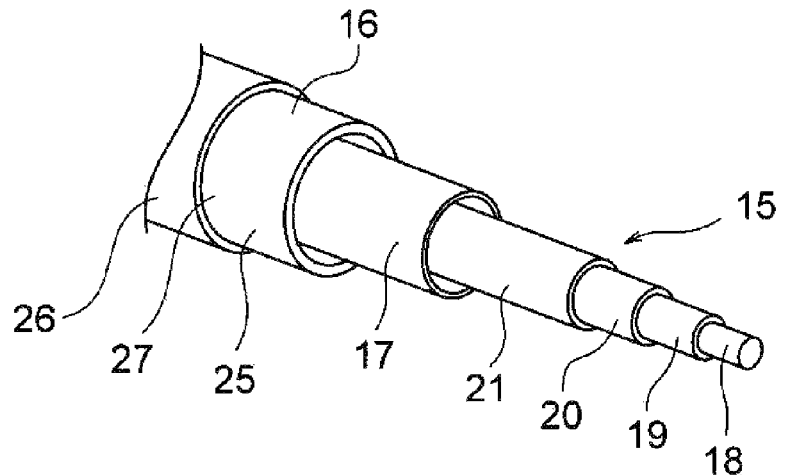
FIGS. 2A to 2C show configurations of conductor lines of the wiring harness.
Figure 2B:
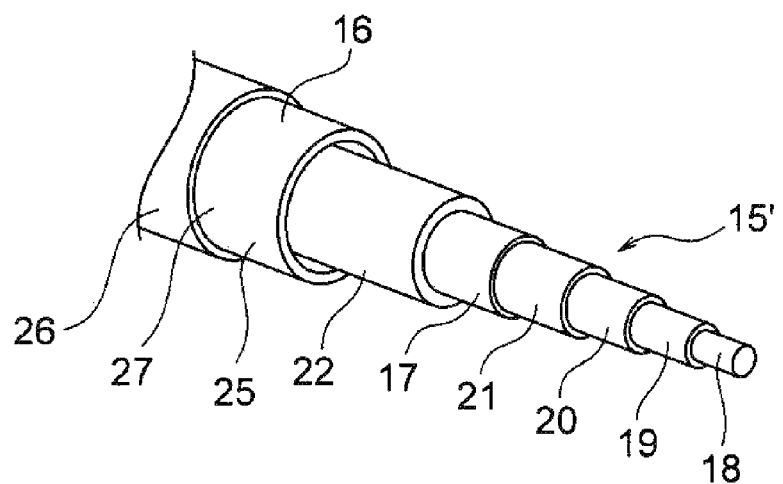
Figure 2C:
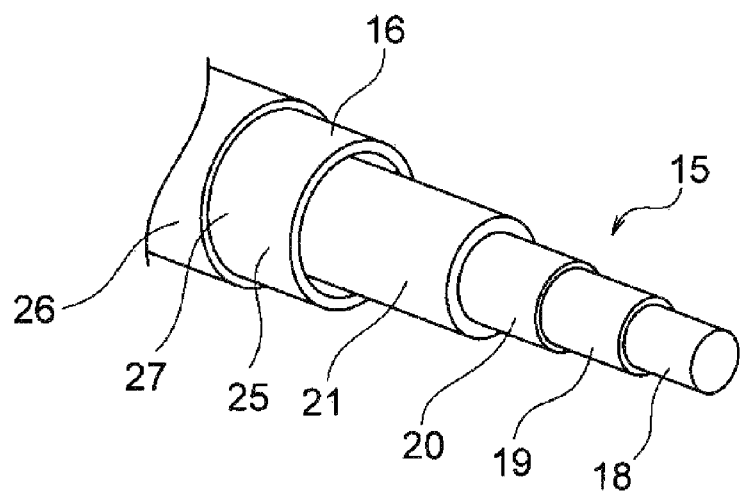
Figure 3:
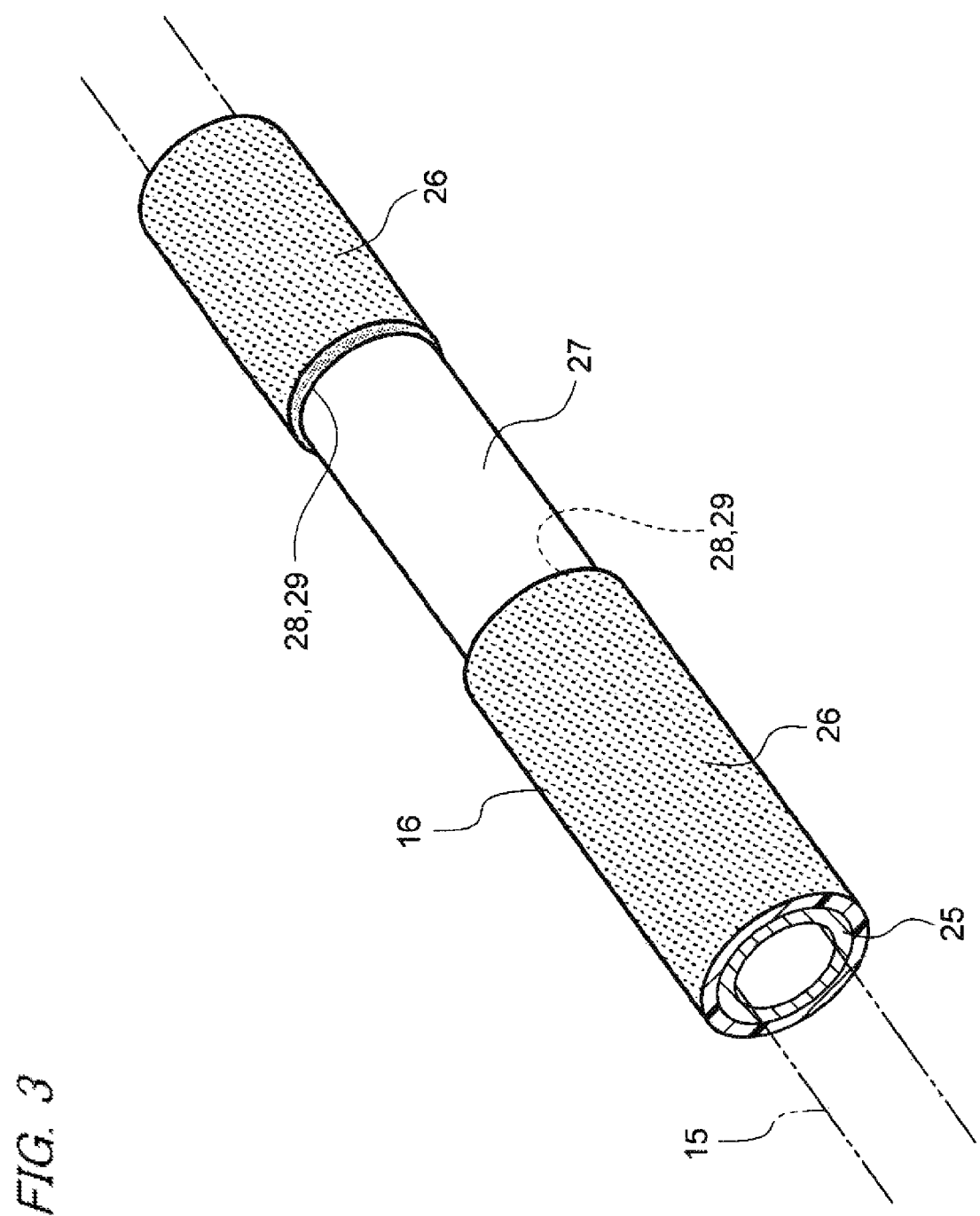
FIG. 3 is a perspective view of an identifying portion and a non-identifying portion which are provided on an outer surface of a conduit member.
Figure 4:
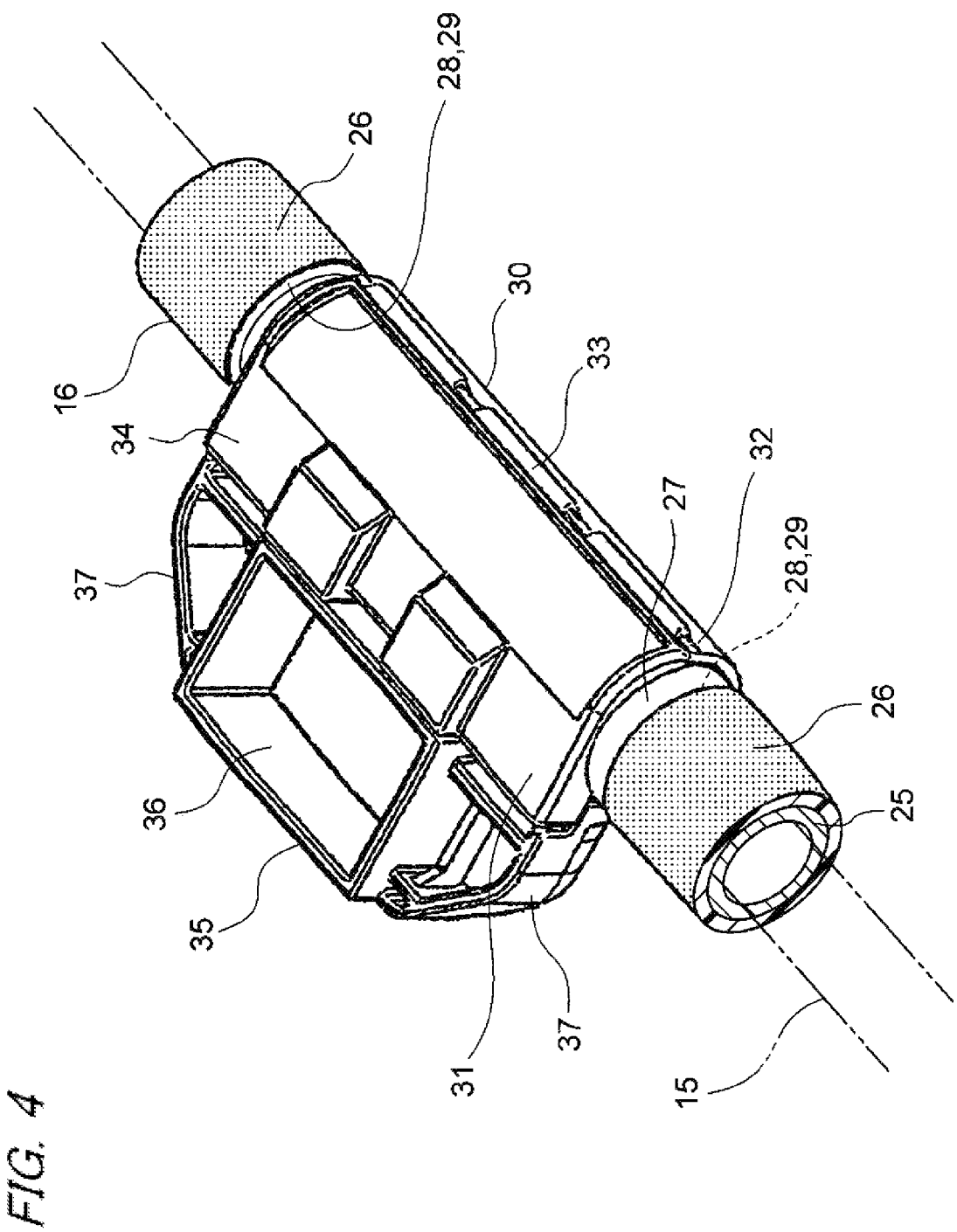
FIG. 4 is a perspective view showing a state in which a clamp is retrofitted to the non-identifying portion.

Hereinafter, an embodiment will be described by reference to the drawings. FIGS. 1A and 1B show a wiring harness of an embodiment of the invention, of which FIG. 1A shows a layout of the wiring harness and FIG. 1B shows a way in which clamps are attached to a conduit member. Additionally, FIGS. 2A to 2C show configurations of conductor lines of the wiring harness, FIG. 3 is a perspective view of an identifying portion and a non-identifying portion which are provided on an external surface of a conduit member, FIG. 4 is a perspective view showing a state in which a clamp is retrofitted to the non-identifying portion, and FIG. 5A is a side view of the wiring harness, and FIG. 5B is a partial enlarged view of FIG. 5A.

In this embodiment, the invention will be described as being applied to a wiring harness which is laid out on a hybrid vehicle (or to a wiring harness which is laid out on an electric vehicle or a general vehicle with an internal combustion engine).

In FIGS. 1A and 1B, reference numeral 1 denotes a hybrid vehicle. A hybrid vehicle 1 is a vehicle which is driven by power from a combination of such power sources as an engine 2 and a motor unit 3. Electric power from a battery 5 (a battery pack) is supplied to the motor unit 3 via an inverter unit 4. In this embodiment, the engine 2, the motor unit 3 and the inverter unit 4 are mounted in an engine compartment 6 which is situated where front wheels are fitted. In addition, the battery 5 is mounted in a rear portion 7 of the vehicle 1 which is situated where rear wheels are fitted (or may be mounted within a passenger compartment of the vehicle 1 which is situated behind the engine compartment 6).

The motor unit 3 and the inverter unit 4 are connected by a high tension wiring harness 8. Additionally, the battery 5 and the inverter unit 4 are also connected by a high tension wiring harness 9. An intermediate portion 10 of the wiring harness 9 is laid out on an underside or ground side of a body floor 11. The wiring harness 9 is laid out substantially parallel along the body floor 11. The body floor 11 is a known body and a so-called panel member, and a through hole (whose reference numeral is omitted) is formed in predetermined positions on the body floor 11. The wiring harness 9 is passed through the through holes formed.

The wiring harness 9 and the battery 5 are connected via a junction box 12 provided in the battery 5. A rear end 13 of the wiring harness 9 is connected electrically to the junction box 12 using a known method. A front end 14 of the wiring harness 9 is connected electrically to the inverter unit 4 using a known method.

The motor unit 3 includes a motor and a generator. Additionally, the inverter unit 4 includes an inverter and a converter. The motor unit 3 is formed as a motor assembly which includes a shield case. In addition, the inverter unit 4 is formed as an inverter assembly which includes a shield case. The battery 5 is an Ni—MH or Li-ion based battery and is formed as a modular unit. It should be noted that it is possible to use a battery unit such as a capacitor, for example. There is imposed no specific limitation on the type of a battery used, provided that a battery 5 can be used in the hybrid vehicle 1 or an electric vehicle.

Firstly, the configuration and construction of the wiring harness 9 will be described. The wiring harness 9 is a high tension member which connects electrically the inverter unit 4 and the battery 5 as described above. The wiring harness 9 is made up of a high tension coaxial composite conductor line 15 (a conductor line), a sheathing member 16 and an electromagnetic shield member 17. The wiring harness 9 is laid out in predetermined positions including the underside of the body floor 11 by utilizing clamps 30 (retrofit members) and is laid out so as to secure a wide road clearance relative to the ground, not shown.

In this embodiment, when the sheathing member 16 has no shield function, the electromagnetic shield member 17 is formed to extend long from the inverter unit 4 to the battery 5, whereas when the sheathing member 16 has a shield function, the electromagnetic shield member 17 is formed so as to be connected to both ends of the sheathing member 16, for example. Additionally, when the sheathing member 16 has no shield function, the electromagnetic shield member 17 is interposed between the high tension coaxial composite conductor line 15 and the sheathing member 16 or is incorporated in the configuration of the conductor line. A known braid or simple metallic foil member or a shield member containing a metallic foil is adopted as the electromagnetic shield member 17. As other examples of electromagnetic shield members, a metallic foil is provided on, for example, an inner surface of a sheathing member 16, or a sheathing member 16 is manufactured of a conductive material, so that the resulting sheathing member 16 is applied to a conductive portion of the conductor line 15. The electromagnetic shield member 17 is connected via a connector or directly to the shield case of the inverter unit 4.

In FIG. 2A, a high tension coaxial composite conductor line 15 is configured so that the single conductor line 15 has both a positive circuit and a negative circuit. Namely, the high tension coaxial composite conductor line 15 is configured so as to have the circuits of two systems. Specifically, the high tension coaxial composite conductor line 15 is configured so as to include a first conductor line 18 positioned in the center of the conductor line 15 and having a circular cross section, a first insulator 19 which covers an outer circumference of the first conductor line 18 in a predetermined thickness, a second conductor line 20 which is provided on an outer side of the first insulator 19 and a second insulator 21 which covers an outer circumference of the second conductor line 20 in a predetermined thickness. A tubular electromagnetic shield member 17 is interposed between the high tension coaxial composite conductor line 15 and a sheathing member 16. The electromagnetic shield member 17 is made of a known braid or metallic foil and is formed so as to be placed on the high tension coaxial composite conductor line 15 slightly loosely or with a slight gap defined therebetween (or the electromagnetic shield member 17 may be wound around an outer circumference of the second insulator 21 so as to be tightly attached thereto).

In FIG. 2B, a high tension coaxial composite conductor line 15' is a modified example to the high tension coaxial composite conductor line 15 shown in FIG. 2A and includes a first conductor line 18, a first insulator 19, a second conductor line 20, a second insulator 21, an electromagnetic shield member 17 which is provided on an outer side of the second insulator 21 and a sheath 22 which covers an outer circumference of the electromagnetic member 17 in a predetermined thickness.

It should be noted that the sheathing members 16 shown in FIGS. 2A and 2B may be applied equally to a conduit member 25, which will be described later, whether the conduit member 25 is made of resin or metal. In FIG. 2C, a conduit member 25 is made of metal and the conduit member 25 itself makes up a shield member, and in the case of the conduit member 25 being configured in that way, an electromagnetic shield member 17 is connected to an end of the conduit member 25.

In addition to the high tension coaxial composite conductor line 15 (15') described above, a known high tension electric wire including a conductor and an insulator, a shielded wire and a cabtyre cable can be raised as a conductor line.

In FIGS. 1A to 2C, the sheathing member 16 is a tubular member which is intended to accommodate and protect the high tension coaxial composite conductor line 15 (15') and has bent tubular portions 23 and straight or non-bent tubular portions 24. The bent tubular portions 23 are produced as bent portions when the wiring harness 9 is laid out into a predetermined line, and the non-bent tubular portions 24 are left as straight or non-bent portions when the wiring harness 9 is laid out so. In this embodiment, the sheathing member 16 formed as described above has a circular cross section (the cross section is not limited to the circular cross section and hence may be oval or elliptic).

In FIG. 3, the sheathing member 16 includes identifying portions 26 which are provided so as to cover an outer surface of the conduit member 25 and non-identifying portions 27 where identifying portions 26 are not provided circumferentially on the conduit member 25. The conduit member 25 is formed by extruding a metal, for example. In this embodiment, the conduit member 25 has a circular cross section. In this embodiment, for example, an aluminum pipe (one of examples) is adopted as the conduit member 25. A bore diameter of the conduit member 25 is set to such a dimension as to accommodate therein only a conductor line like the high tension coaxial composite conductor line 15 (refer to FIGS. 2A and 2C), and an outside diameter thereof is set to a small diametrical dimension while taking the strength thereof into consideration.

The identifying portions 26 are portions which are colored orange to indicate that a high tension conductor line is accommodated in the sheathing member 16 (no specific limitation being imposed on the color, hence allowing any predetermined color to be used). The identifying portion 26 is made up of any of a resin layer which is extruded from a resin material (for example, polypropylene (PP)), an elastomer tube, a heat-shrinkable tube and a painting or a member which corresponds to any of them.

The non-identifying portions 27 are portions where identifying portions 26 are not provided circumferentially on the conduit member 25 as described above and are also portions where the conduit member 25 is exposed in this embodiment. Since the non-identifying portions 27 are the portions where the conduit member 25 is exposed, an outside diameter of the sheathing member 16 is reduced at the non-identifying portions 27.

Since the outside diameter of the sheathing member 16 is reduced at the non-identifying portions 27, a level difference 28 is produced between the identifying portion 26 and the non-identifying portion 27. The level difference 28 corresponds to the thickness of the identifying portion 26. The level difference 28 is used as a position restricting portion 29 for a clamp 30 (a retrofit member, refer to FIGS. 1B and 4), which will be described later, that is, as a portion which restricts the position of the clamp 30. The level difference 28 acting as the position restricting portion 29 not only prevents a positional displacement of the clamp 30 but also facilitates the positioning of the clamp 30. In addition, in the case of the clamp 30 being able to move, the level difference 28 can restrict the moving range of the clamp 30.

It should be noted that when the level difference 28 functions to restrict the moving range of the clamp 30, a dimension B of the non-identifying portion 27 is set larger than a dimension A of the clamp 30 (A<B).

In FIGS. 4, 5A and 5B, the clamp 30 is retrofitted to the non-identifying portion 27. In laying out the wiring harness 9, the clamp 30 is fixed to a stud bolt, not shown, planted in the body floor 11.

The clamp 30 includes a clamp fixing portion (whose illustration is omitted) functioning as a portion which works with the stud bolt, not shown, and a clamp main body 31 functioning as a portion which works with the sheathing member 16 and is formed so that the clamp fixing portion and the clamp main body 31 are integrated into one unit. The clamp fixing portion, not shown, is assembled to a fixing portion base 35, which will be described later, of the clamp main body 31.

The clamp 30 is made from resin and may be colored according to the sheathing member 16 or an attaching portion thereon, or the form of the wiring harness 9. Namely, the clamp 30 may function as an identifying member by itself.

The clamp main body 31 has a lower main body portion 32, a hinge 33, an upper main body portion 34, and a pair of lock portions (whose illustration is omitted) which locks the lower main body portion 32 and the upper main body portion 34 together and is formed into a substantially cylindrical shape. The fixing portion base 35 is formed integrally on a side middle portion of the clamp main body 31. A clamp fixing portion, not shown, is accommodated in an accommodating space 36 in the fixing portion base 35. The fixing portion base 35 is protected by a pair of cover portions 37 projecting from both ends of the side portion of the clamp main body 31.

Although the clamp 30 of this embodiment corresponds to a retrofit member described in claims of this patent application, for example, a known protector or grommet can be raised as the retrofit member.

Thus, as has been described by reference to FIGS. 1A to 5B, in the wiring harness 9, the conduit member 25 is contained in the sheathing member 16 which makes up the wiring harness 9, and the identifying portions 26 and the non-identifying portions 27 are provided on the outer surface of the conduit member 25. The non-identifying portions 27 are provided as the portions where the identifying portions 26 are not provided circumferentially, and the outside diameter of the sheathing member 16 at the portions where the non-identifying portions 27 are provided becomes smaller than at the portions where the identifying portions 26 are provided. Then, when the clamps 30 which are retrofit members are attached to the non-identifying portions 27 where the outside diameter of the sheathing member 16 is reduced, the wiring harness 9 is made smaller in size, and the wiring harness 9 can be laid out so as to ensure a wide road clearance relative to the ground.

Consequently, according to the invention, it is possible to realize a reduction in projection of the wiring harness 9 when it is laid out on the ground side of the body floor 11.

It is apparent that various modifications can be made in the invention within a scope not deviating from the gist of the invention.

The present invention is useful for providing a wiring harness which can realize a reduction in its height or projection towards the road surface.

What is claimed is:

1. A wiring harness, comprising
   a conduit member which accommodates therein one or a plurality of conductor lines;
   an identifying portion colored in a predetermined color and given a predetermined thickness and provided on an outer surface of the conduit member; and
   a non-identifying portion defined as an exposed portion of the conduit member where the identifying portion is not provided circumferentially, wherein
   a retrofit member is attached to the exposed portion of the conduit member corresponding to the non-identifying portion, and
   the identifying portion is provided in direct contact with the outer surface of the conduit member about an entire outer circumference of the conduit member.

2. The wiring harness according to claim 1, wherein
   a level difference produced between the identifying portion and the non-identifying portion functions as a position restricting portion for the retrofit member.

3. The wiring harness according to claim 1, wherein
   the identifying portion is made up of any of a resin layer, a tube and a painting, and wherein the retrofit member is made up of any of a clamp, a protector and a grommet.

* * * * *